US010392001B2

(12) United States Patent
Gaither et al.

(10) Patent No.: US 10,392,001 B2
(45) Date of Patent: Aug. 27, 2019

(54) EFFICIENT ACCELERATION SEMI-AUTONOMOUS FEATURE

(71) Applicant: Toyota Motor Engineering & Manufacturing North America, Inc., Erlanger, KY (US)

(72) Inventors: Geoffrey D. Gaither, Brighton, MI (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 144 days.

(21) Appl. No.: 15/675,551

(22) Filed: Aug. 11, 2017

(65) Prior Publication Data
US 2019/0047545 A1    Feb. 14, 2019

(51) Int. Cl.
| | |
|---|---|
| *B60K 31/00* | (2006.01) |
| *G01C 21/26* | (2006.01) |
| *F16H 59/36* | (2006.01) |
| *B60W 20/11* | (2016.01) |
| *G05D 1/02* | (2006.01) |

(52) U.S. Cl.
CPC .......... *B60W 20/11* (2016.01); *G05D 1/0246* (2013.01); *B60L 2240/486* (2013.01); *B60W 2720/106* (2013.01)

(58) Field of Classification Search
USPC ........................................................ 701/70
See application file for complete search history.

(56) References Cited

U.S. PATENT DOCUMENTS

| | | | |
|---|---|---|---|
| 5,832,400 A | * | 11/1998 | Takahashi .............. B60K 31/00 701/53 |
| 6,067,495 A | | 5/2000 | Fliearman et al. |
| 8,521,338 B2 | | 8/2013 | Takeuchi et al. |
| 8,972,162 B1 | | 3/2015 | Koebler et al. |
| 9,361,272 B2 | | 6/2016 | Syed et al. |
| 9,376,109 B2 | | 6/2016 | Johansson et al. |
| 9,393,963 B2 | | 7/2016 | Slaton et al. |
| 9,452,755 B2 | | 9/2016 | Kastner et al. |
| 9,493,071 B2 | | 11/2016 | Lindhuber et al. |
| 9,569,984 B2 | | 2/2017 | Stankoulov |
| 9,573,595 B2 | | 2/2017 | Fairgrieve et al. |

(Continued)

FOREIGN PATENT DOCUMENTS

CN        103496368        1/2014

*Primary Examiner* — Adam D Tissot
(74) *Attorney, Agent, or Firm* — Snell & Wilmer LLP

(57) ABSTRACT

A system includes a power source to generate power to propel the vehicle, and a speed sensor to detect a current speed. The system also includes a camera to detect image data corresponding to a current roadway, and a GPS sensor to detect location data corresponding to a current location of the vehicle. The system also includes an ECU. The ECU is designed to determine a target vehicle speed based on at least one of the image data or the location data. The ECU is also designed to calculate an energy-efficient acceleration pattern to accelerate the vehicle from the current speed to the target vehicle speed based on a goal to minimize energy usage of the power source. The ECU is also designed to control the power source to accelerate the vehicle from the current speed to the target vehicle speed using the energy-efficient acceleration pattern.

19 Claims, 6 Drawing Sheets

(56) References Cited

U.S. PATENT DOCUMENTS

| | | |
|---|---|---|
| 2006/0089800 A1* | 4/2006 | Svendsen .............. G05D 1/027 |
| | | 701/301 |
| 2011/0205044 A1 | 8/2011 | Enomoto et al. |
| 2012/0130611 A1* | 5/2012 | Al Alam ............. B60W 30/188 |
| | | 701/70 |
| 2013/0143181 A1 | 6/2013 | Greenberg et al. |
| 2016/0318513 A1 | 11/2016 | Lee |

* cited by examiner

EFFICIENT ACCELERATION SEMI-AUTONOMOUS FEATURE

BACKGROUND

1. Field

The present disclosure relates to systems and methods for determining efficient acceleration patterns of a vehicle and for controlling the vehicles to accelerate using the efficient acceleration patterns.

2. Description of the Related Art

There has been a recent push for vehicle manufacturers to improve vehicle efficiency for various reasons such as reduce carbon emissions, reduce costs of operating vehicles, increased vehicle appeal, and the like. Multiple methods have been discovered for improving vehicle efficiency. One such method controls operation of climate control settings of the vehicle to reduce power consumption during vehicle acceleration. Another such method is the use of hybrid vehicles to recapture energy that is typically lost during vehicle deceleration. Due to the complexity of vehicles, numerous options are available to further improve their energy efficiency.

Often times, vehicles are most inefficient during an acceleration. This may be especially true when a driver is relatively aggressive. In many cases, the rate of acceleration is entirely decided by a driver regardless of any surrounding inputs. Such accelerations may occur along a highway on-ramp, when a vehicle turns on a new road, or when a speed limit along a current roadway increases. There are often times multiple ways that a vehicle can accelerate. Some acceleration patterns may be relatively energy-efficient and some acceleration patterns may be relatively energy-inefficient.

Accordingly, it is desirable to determine energy-efficient acceleration patterns and to control a vehicle to accelerate using the energy-efficient acceleration patterns.

SUMMARY

Described herein is a system for controlling a vehicle to accelerate efficiently. The system includes a power source designed to generate power to propel the vehicle, and a speed sensor designed to detect a current speed of the vehicle. The system also includes a camera designed to detect image data corresponding to a current roadway, and a global positioning system (GPS) sensor designed to detect location data corresponding to a current location of the vehicle. The system also includes an electronic control unit (ECU) coupled to the power source, the speed sensor, the camera, and the GPS sensor. The ECU is designed to determine a target vehicle speed that is greater than the current speed of the vehicle based on at least one of the image data or the location data. The ECU is also designed to calculate an energy-efficient acceleration pattern to accelerate the vehicle from the current speed to the target vehicle speed based on a goal to minimize energy usage of the power source. The ECU is also designed to control the power source to accelerate the vehicle from the current speed to the target vehicle speed using the energy-efficient acceleration pattern.

Also described is a system for controlling a vehicle to accelerate efficiently. The system includes a power source designed to generate power to propel the vehicle, and a speed sensor designed to detect a current speed of the vehicle. The system also includes a camera designed to detect image data corresponding to a current roadway, and a global positioning system (GPS) sensor designed to detect location data corresponding to a current location of the vehicle. The system also includes an input device designed to receive input data, and an output device designed to output data. The system also includes an electronic control unit (ECU) coupled to the power source, the speed sensor, the camera, the GPS sensor, the input device, and the output device. The ECU is designed to predict that the vehicle is to accelerate to a target vehicle speed based on at least one of the image data or the location data. The ECU is also designed to control the output device to output data indicating the predicted acceleration. The ECU is also designed to control the input device to receive confirmation that the vehicle is to accelerate to the target vehicle speed. The ECU is also designed to calculate an energy-efficient acceleration pattern to accelerate the vehicle from the current speed to the target vehicle speed based on a goal to minimize energy usage of the power source. The ECU is also designed to control the power source to accelerate the vehicle from the current speed to the target vehicle speed using the energy-efficient acceleration pattern after the input device receives the confirmation.

Also described is a method for controlling a vehicle to accelerate efficiently. The method includes generating, by a power source, power to propel the vehicle, and detecting, by a speed sensor, a current speed of the vehicle. The method also includes detecting, by a camera, image data corresponding to a current roadway, and detecting, by a global positioning system (GPS) sensor, location data corresponding to a current location of the vehicle. The method also includes determining, by an electronic control unit (ECU), a target vehicle speed that is greater than the current speed of the vehicle based on at least one of the image data or the location data. The method also includes calculating, by the ECU, an energy-efficient acceleration pattern to accelerate the vehicle from the current speed to the target vehicle speed based on a goal to minimize energy usage of the power source. The method also includes controlling, by the ECU, the power source to accelerate the vehicle from the current speed to the target vehicle speed using the energy-efficient acceleration pattern.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for determining efficient acceleration patterns of a vehicle. The systems provide several benefits and advantages such as determining energy-efficient acceleration patterns, and controlling a vehicle to accelerate using the determined energy-efficient acceleration patterns. The energy-efficient acceleration patterns are acceleration patterns which utilize less energy than alternative acceleration patterns and, thus, the systems provide improved energy efficiency for vehicles. The systems provide additional benefits such as determining efficient speeds for the vehicle to travel after the acceleration. The system may control the vehicle to accelerate to the efficient speeds and control the vehicle to cruise at the efficient speeds, providing the benefit of increased energy efficiency of the vehicle. The system may also advantageously detect efficiency of accelerations as the vehicle is driven and may update the calculations of the energy-efficient acceleration patterns based on recently detected information. This provides the advantage of increased accuracy of the energy-efficient acceleration patterns.

An exemplary system includes a plurality of sensors that can detect data corresponding to a load of the vehicle (such as a mass of the vehicle, a grade of the roadway, or the like) and a speed sensor that can detect a current speed of the vehicle. The system also includes at least one of a sensor, a network access device, or a memory (which includes map data) that can detect, receive, or retrieve data usable to determine or predict an upcoming acceleration of the vehicle and a target speed of the vehicle after the acceleration. The system also includes an electronic control unit (ECU). The ECU may analyze the detected, received, or retrieved data to predict the upcoming acceleration and to predict the target vehicle speed. The ECU may also calculate an energy-efficient acceleration pattern and may control the power source of the vehicle to accelerate using the energy-efficient acceleration pattern.

Figure 1:
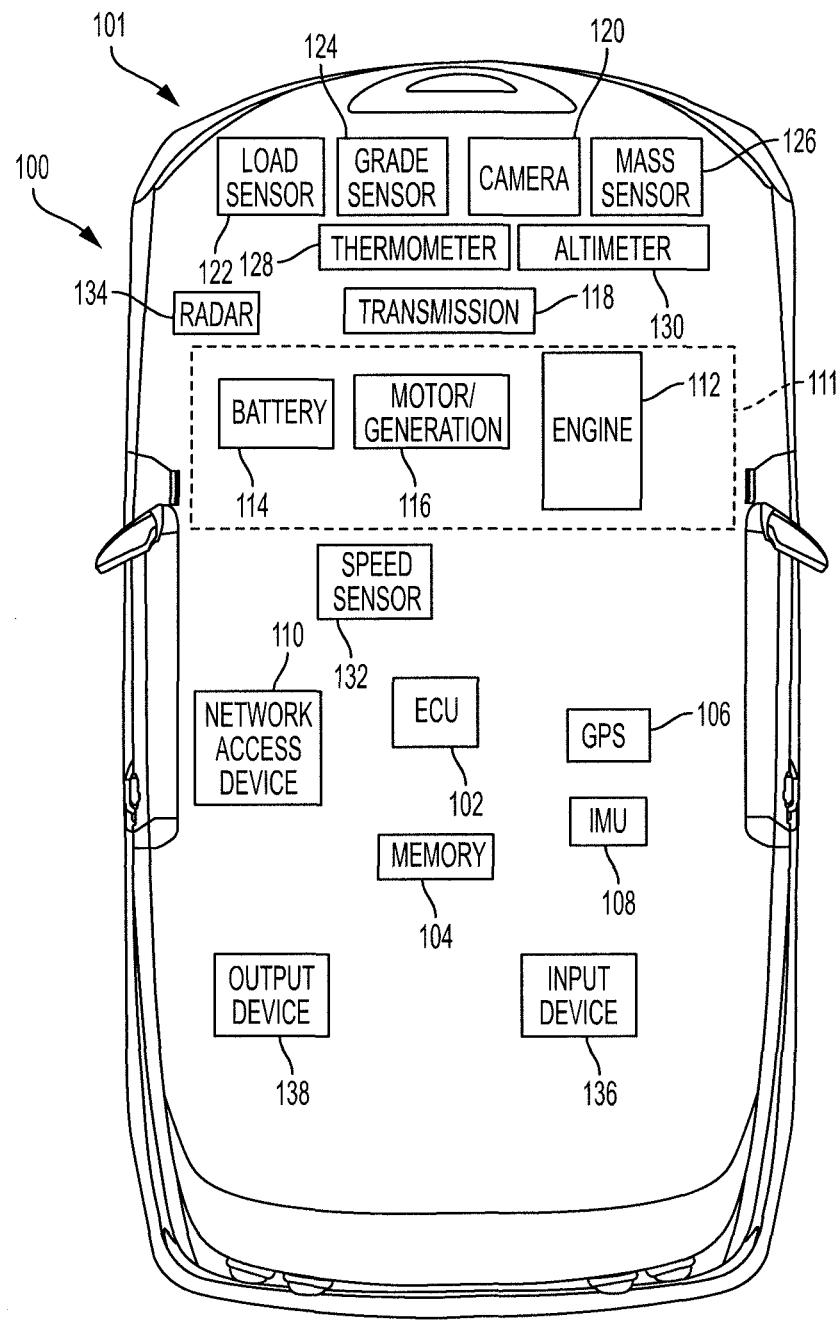
FIG. 1 is a block diagram illustrating various components of a vehicle capable of determining efficient vehicle speeds, determining efficient vehicle acceleration patterns, and controlling a power source to accelerate and travel at the efficient vehicle speeds and the efficient vehicle acceleration patterns according to an embodiment of the present invention.

Turning to FIG. 1, a vehicle 100 includes components of a system 101 for improving efficiency of the vehicle 100. In particular, the vehicle 100 and system 101 include an ECU 102, a memory 104, a global positioning system (GPS) sensor 106, an inertial measurement unit (IMU) sensor 108, and a network access device 110. The vehicle 100 and system 101 further include a power source 111 which may include one or more of an engine 112 or a combination of a battery 114 and motor-generator 116. The vehicle 100 and system 101 may further include a transmission 118 for applying mechanical power from the engine 112 or the motor-generator 116 to wheels to propel the vehicle 100.

The vehicle 100 and system 101 further include one or more sensors including a camera 120, a load sensor 122, a grade sensor 124, a mass or weight sensor 126, a thermometer or other temperature sensor 128, an altimeter 130, a speed sensor 132, and a radio detection and ranging (radar) sensor 134. The vehicle 100 and system 101 also include an input device 136 and an output device 138.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

In some embodiments, the vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory known in the art. In that regard, the memory 104 may store machine-readable instructions usable by the ECU 102 and may store other data as requested by the ECU 102.

The GPS sensor 106 may be capable of detecting location data corresponding to a location of the vehicle 100. The IMU sensor 108 may detect a velocity or an orientation of the vehicle 100. One or both of the GPS sensor 106 or the IMU sensor 108 may be referred to as a location sensor and may be used to determine a current location, heading, and/or orientation of the vehicle 100. In some embodiments, one or both of the GPS sensor 106 or the IMU sensor 108 may be capable of detecting a speed of the vehicle 100 and may thus be referred to as a speed sensor.

The speed sensor 128 may be any speed sensor capable of detecting data usable to determine a speed of the vehicle 100. For example, the speed sensor 128 may include a GPS sensor or an IMU sensor, as mentioned above. The speed sensor 128 may also or instead include an angular velocity sensor configured to detect an angular velocity of the wheels of the vehicle 100 or the engine, a speedometer, or the like.

The network access device 110 may include any port or device capable of communicating via a wired or wireless interface such as Wi-Fi, Bluetooth, a cellular protocol, vehicle to vehicle communications, or the like. For example, the ECU 102 may control the network access device 110 to communicate with the cloud, an external vehicle, or any other object or device. In particular, the network access device 110 may communicate directly or indirectly with another vehicle. In that regard, the network access device 110 may communicate via a vehicle to vehicle (V2V) protocol and may thus be referred to as a V2V network access device. In some embodiments, the network access device 110 may transmit a current vehicle speed or a current acceleration or deceleration of the vehicle 100 to nearby vehicles.

The engine 112 may convert a fuel into mechanical power. In that regard, the engine 112 may be a gasoline engine, a diesel engine, a fuel cell generator, or the like.

The battery 114 may store electrical energy. In some embodiments, the battery 114 may include any one or more energy storage device including a battery, a fly-wheel, a super-capacitor, a thermal storage device, or the like. The motor-generator 116 may convert the electrical energy stored in the battery (or generated by a fuel cell generator) into mechanical power usable by the transmission 118. The motor-generator 116 may further convert mechanical power received from the transmission 118 into electrical power, which may be stored in the battery 114 as energy and/or used by other components of the vehicle 100. In some embodiments, the motor-generator 116 may also or instead include a turbine or other device capable of generating thrust.

The transmission 118 may be coupled to the engine 112 and the motor-generator 116. The transmission 118 may include a power splitter and may transfer mechanical power received from one or both of the engine 112 and the motor-generator 116 to wheels of the vehicle 100. The transmission 118 may control how much mechanical power is transferred from each of the engine 112 and the motor-generator 116. For example, the ECU 102 may control the transmission 118 to achieve a desired power transfer from each of the engine 112 and the motor-generator 116. The transmission 118 may further transfer mechanical energy received from one or both of the engine 112 or wheels of the vehicle 100 to the motor-generator 116 for conversion into electrical power.

Although the present discussion is related to the vehicle 100 having a hybrid power source 111, one skilled in the art will realize that a vehicle may include any one or combination of an engine, a fuel cell engine, a motor-generator and a battery, or the like without departing from the present disclosure.

The camera 120 may include one or more camera oriented in such a manner as to be able to detect image data corresponding to an environment of the vehicle 100. For example, the camera 120 may be positioned on a front of the vehicle 100 and may be capable of detecting image data corresponding to a nearby vehicle or street sign.

The load sensor 122 may include any sensor capable of detecting load data corresponding to a load applied to the vehicle 100. A load may be defined as a resistance or other force or phenomenon applied to, or experienced by, the vehicle 100 that causes the power source 111 to generate more or less power to cause the vehicle 100 to remain at a constant speed relative to when the load is not applied. For example, a load may include a weight or mass of the vehicle (including weight of cargo or passengers), a grade of a roadway, and altitude of the roadway, a velocity of a headwind or a tailwind, an ambient temperature outside of the vehicle 100, or the like. The load data detected by the load sensor 122 may be used to determine a load applied to the vehicle 100.

In some embodiments, load data may likewise be received from the network access device 110 or stored in the memory 104. For example, weather information, such as a current temperature, may be received by the network access device 110 via the cloud. Similarly, navigation information may be received from the network access device 110 or stored in the memory 104. The ECU 102 may transmit or compare the current location of the vehicle 100 to the navigation information to find a current grade of a roadway that corresponds to the current location or an upcoming location.

The grade sensor 124 may include any sensor capable of detecting a grade of the current roadway. For example, the grade sensor 124 may include the IMU sensor 108 or another device capable of determining data that corresponds to the grade of the roadway.

The weight or mass sensor 126 may include any sensor capable of detecting data corresponding to a mass of the vehicle. For example, the mass sensor 126 may include one or more sensor coupled to the wheels or suspension of the vehicle 100 that can detect the current mass of the vehicle 100. As another example, the mass sensor 126 may include one or more sensor positioned beneath a cargo compartment or a seat of the vehicle 100 that can detect the mass of an object or person located in the cargo compartment or on the seat.

The thermometer 128 may be capable of detecting data corresponding to a current temperature. For example, the thermometer 128 may be located outside of the vehicle 100 and detect an ambient temperature outside of the vehicle, may be located in an engine compartment of the vehicle 100 and detect a temperature within the engine compartment, or the like.

The altimeter 130 may include any sensor or component capable of detecting a current altitude of the vehicle 100. In some embodiments, the altimeter 130 may detect the altitude directly or may calculate the altitude by comparing the current location of the vehicle to a database of locations and corresponding altitudes.

The radar sensor 134 may include one or more radar device oriented in such a manner as to be able to detect radar data corresponding to an environment of the vehicle 100. For example, the radar sensor 134 may transmit a radar beam, receive a reflection of the radar beam, and analyze the reflection of the radar beam to determine the presence and characteristics of objects in the environment of the vehicle 100, such as a nearby vehicle. In some embodiments, the vehicle 100 may include a light imaging, detection, and ranging (LIDAR) sensor instead of, or in addition to, the radar sensor 134. The LIDAR sensor may function in a similar manner as the radar sensor 134 but may transmit and receive light instead of a radar beam. The LIDAR sensor or radar sensor 134 may detect data corresponding to traffic conditions on a current roadway, including the speed of surrounding vehicles.

The input device 136 may include any input device capable of receiving input from a user. For example, the input device may include a touchscreen, a touchpad, a keyboard, a button, or the like. The output device 138 may include any output device capable of outputting data to a user. For example, the output device may include a touchscreen, a display, a speaker, or the like.

The system 101 may be used to control the vehicle 100 to operate in a relatively energy efficient manner. In that regard, the ECU 102 may receive data from the sensors of the vehicle 100 and determine efficient vehicle speeds of the vehicle or energy-efficient acceleration patterns of the vehicle that provide improved energy efficiency based on the detected data. The ECU 102 may also provide instructions to a driver regarding how to achieve the improved energy efficiency or may directly control the power source 111 to improve the energy efficiency.

Figure 2A:
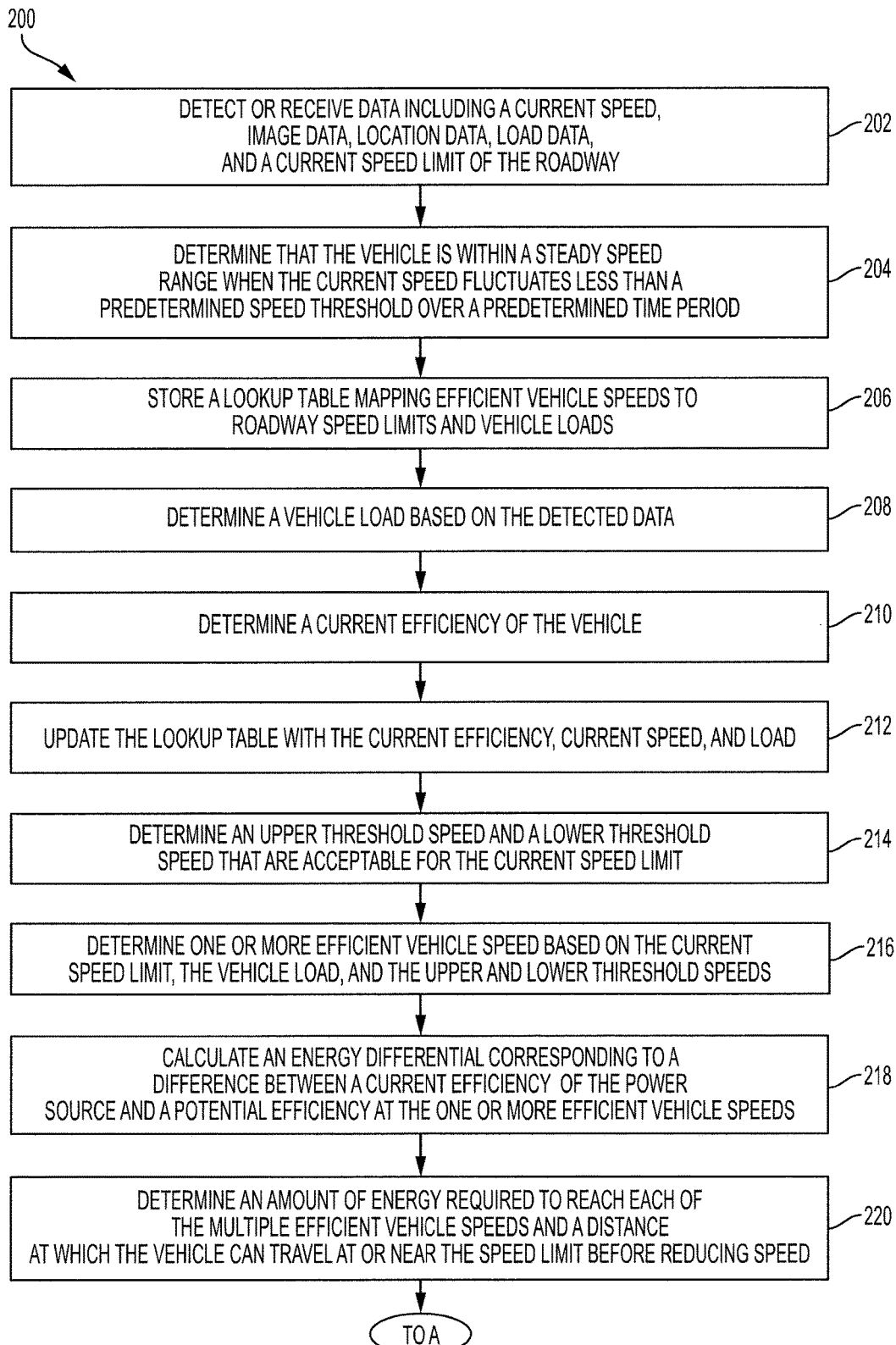
FIGS. 2A and 2B are flowcharts illustrating a method for determining efficient vehicle speeds for a given speed limit and a given vehicle load according to an embodiment of the present invention.
Figure 2B:
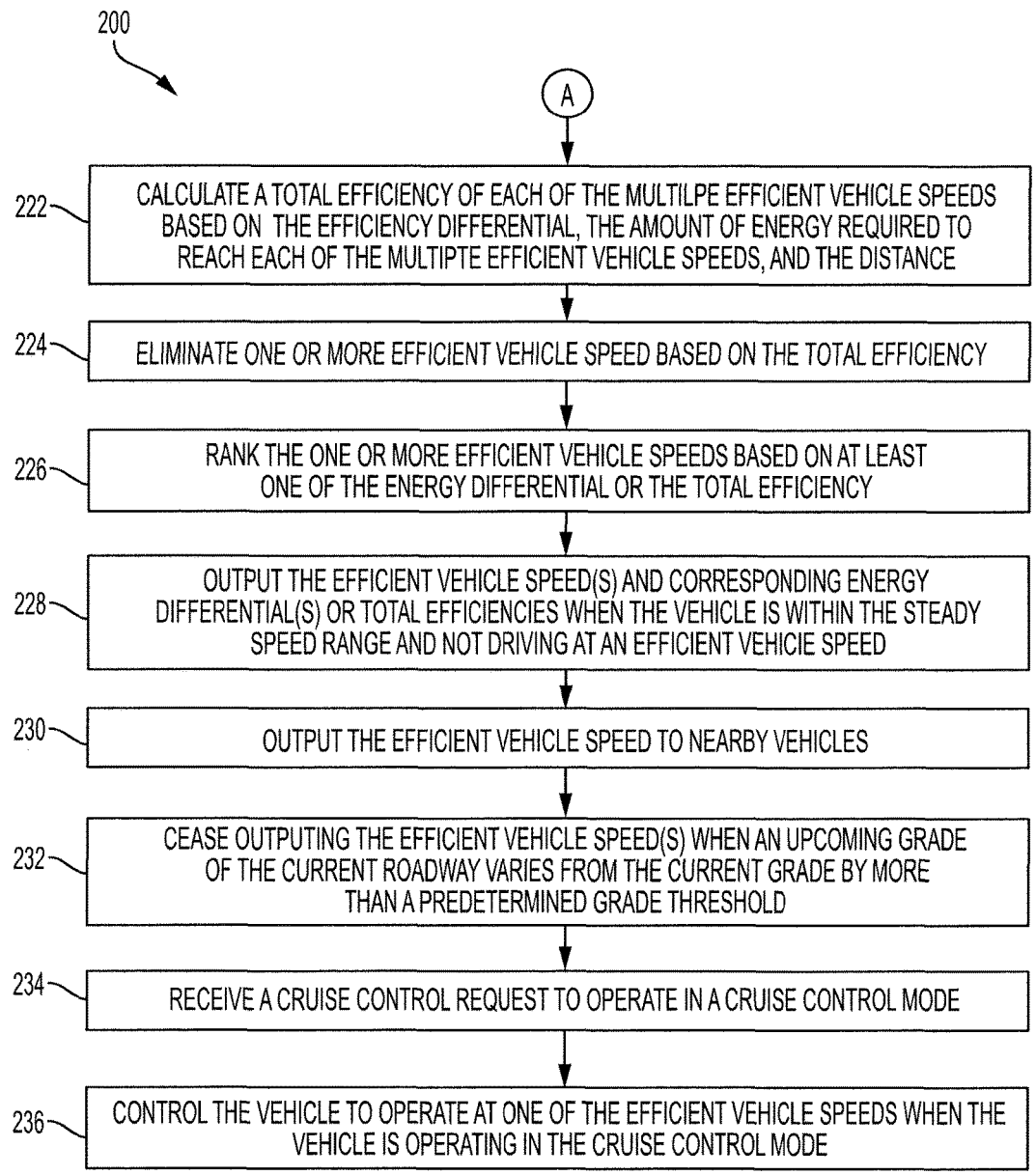

Referring now to FIGS. 2A and 2B, a method 200 for determining an efficient driving speed of a vehicle, such as the vehicle 100 of FIG. 1, is shown. In block 202, various components of the vehicle may detect or receive data. For example, the data may include a current speed detected by a speed sensor, image data detected by a camera, location data detected by a GPS or IMU sensor, load data detected by one or more load sensor, and a current speed limit of the roadway detected by a camera, stored in a memory, or received via a network access device.

In block 204, the ECU of the vehicle may determine whether the vehicle is within a steady speed range. The steady speed range indicates that the vehicle is moving at a relatively constant speed. The vehicle may be considered to be within the steady speed range when the current speed of the vehicle fluctuates less than a predetermined speed threshold over a predetermined time period. The predetermined speed threshold may correspond to a speed fluctuation that is normal during a cruising or constant speed operation, such as two miles per hour (2 mph), 3 miles per hour, 5 miles per hour, or the like. The predetermined time period corresponds to an amount of time sufficiently long that the ECU may infer that the vehicle speed will remain constant. For example, the predetermined time period may be 3 seconds, 5 seconds, 10 seconds, or the like.

As an example, the predetermined speed threshold may be 3 mph and the predetermined time period may be 5 seconds. The vehicle may travel between 71 and 73 miles per hour for 5 consecutive seconds. After the expiration of the 5 consecutive seconds, the ECU may determine that the vehicle is within the steady speed range because the vehicle speed has fluctuated relatively little over a relatively long period of time. This indicates that the vehicle is likely cruising along the roadway at a steady speed.

In block 206, a lookup table may be stored in the memory. The lookup table may map efficient vehicle speeds to roadway speed limits and vehicle loads. In that regard, the ECU may determine a speed limit of a current roadway and a current load of the vehicle. The ECU may compare the speed limit and the current load to the lookup table to determine one or more efficient vehicle speeds that correspond to the speed limit and current load. The one or more efficient vehicle speeds may correspond to vehicle speeds that are acceptable for the given speed limit and that result in the power source being relatively energy efficient (i.e., the power source uses less energy to move the vehicle at an efficient speed than at other speeds).

In some embodiments, the lookup table may be created by the vehicle manufacturer and stored in the memory prior to distribution of the vehicle. In some embodiments, the lookup table may be created by the ECU as the vehicle is being driven. For example, the ECU may determine efficiency of the power source at various speeds and vehicle loads and store the results. The ECU may populate the lookup table with the speeds, the efficiency, and the vehicle loads. In some embodiments, the lookup table may be created by the vehicle manufacturer and updated by the ECU as the vehicle is driven.

In block 208, the ECU may determine a current load of the vehicle based on the detected or received data. For example, the current load of the vehicle may be based on load data including one or more of a grade of a current roadway, a total weight or mass of the vehicle, and altitude of the current roadway, a velocity of a headwind or a tailwind, a current ambient temperature outside of the vehicle, or the like.

The load data may be detected by various sensors of the vehicle, such as a grade sensor or a mass sensor, may be received from surrounding vehicles or the cloud via a network access device, or may be based on a combination of detected and received data.

In block 210, the ECU may determine a current efficiency of the vehicle. For example, the ECU may analyze an amount of power or energy utilized to move the vehicle a certain distance. The amount of power or energy may correspond to an amount of fuel burned by an engine, an amount of electrical energy utilized by a motor-generator, or the like. For example, the current efficiency of the vehicle may be measured in miles per gallon, miles per kilowatt-hour, or the like.

In block 212, the ECU may update the lookup table with the current efficiency of the vehicle along with the current speed and a load of the vehicle. In that regard, the accuracy of the lookup table may be continuously improved by updating the lookup table with newly detected and determined data. This may be beneficial because the association between efficiency, speeds, and vehicle loads may change over time for various reasons. For example, efficient speeds of a vehicle may change for a given load if new tires are installed on the vehicle, if an engine is newly tuned up, or the like.

In block 214, the ECU may determine an upper threshold speed and a lower threshold speed that are acceptable for the current speed limit of the roadway. The upper threshold speed and the lower threshold speed may correspond to speeds that are relatively close to the speed limit and that are considered safe and legal. In some embodiments, the upper threshold speed and the lower threshold speed may each be a predetermined speed, such as 3 mph or 5 mph, above or below a current speed limit. For example, the current speed limit may be 70 mph and the predetermined speed may be 3 mph. In this example, the upper threshold speed may be 73 mph and the lower threshold speed may be 67 mph.

In some embodiments the upper threshold speed and threshold speed may be a predetermined percentage above or below a current speed limit. For example, the predetermined percentage may be 10 percent (10%) and the current speed limit may be 50 mph. In this example, the upper threshold speed may be 55 mph and the lower threshold speed may be 45 mph. In some embodiments, the upper threshold speed may be a first speed or percentage above the speed limit and the lower threshold speed may be a second speed or percentage below the speed limit. For example, the upper threshold speed may be 3 miles per hour above the speed limit and the lower threshold speed may be 8 miles per hour below the speed limit.

In some embodiments, the upper threshold speed and the lower threshold speed may be determined based on minimum and maximum speed limits on the current roadway. For example, on a given highway, a minimum allowable speed may be 55 mph and the speed limit may be 70 mph. In this example, the upper threshold speed may be 70 mph and the lower threshold speed may be 55 mph.

In block 216, the ECU may determine one or more efficient vehicle speeds based on the current speed limit, the vehicle load, and the upper and lower threshold speeds. As mentioned above, the efficient vehicle speeds may correspond to speeds at which the power source of the vehicle is more energy-efficient than non-efficient vehicle speeds. Each of the efficient vehicle speeds determined by the ECU may be between the upper threshold speed and the lower threshold speed, either inclusive of the threshold speeds or non-inclusive of the threshold speeds.

In some embodiments, the upper threshold speed may exceed the speed limit by a nominal amount. In these embodiments, the ECU may control the output device to indicate that any efficient vehicle speeds over the speed limit may not be recommended in some situations. In any situation, the ECU will not output any efficient vehicle speeds that present any greater risk than the given speed limit.

In some embodiments, the ECU may determine the one or more efficient vehicle speeds by comparing the current speed limit and the vehicle load to the lookup table stored in the memory. For example, the ECU may compare the current speed limit and the vehicle load to the lookup table and determine all efficient speeds that are between the upper threshold speed and the lower threshold speed. In some embodiments, the ECU may also or instead calculate one or more efficient vehicle speed based on the current speed limit and the vehicle load rather than access the lookup table.

In block 218, the ECU may calculate an energy differential between the current vehicle speed and each of the efficient vehicle speeds determined in block 216. The energy differential may correspond to a difference between a current efficiency of the power source and a potential efficiency of the power source at each of the one or more efficient vehicle speeds.

For example, the power source may include an engine that converts fuel into mechanical energy. The ECU may calculate or otherwise predict a potential efficiency of the engine at each of the efficient vehicle speeds based on the vehicle load and the efficient vehicle speed. In some embodiments, the lookup table may include such potential efficiencies or the ECU may calculate the potential efficiencies. After determining the potential efficiencies at the efficient vehicle speeds, the ECU may determine the difference between the current efficiency and the potential efficiencies.

In block 220, the ECU may determine an amount of energy that the vehicle will expand to reach each of the multiple efficient vehicle speeds. The ECU may further determine a distance at which the vehicle can travel at or near the speed limit before a reduction in speed is required (such as due to a reduction in the speed limit or the vehicle taking an exit). For example, the distance may be determined based on a known or predicted route of the vehicle.

In order to determine the amount of energy required to reach the multiple efficient speeds, the ECU may first determine a difference in speed between the current speed and each of the efficient vehicle speeds. The ECU may then determine an amount of energy required for the vehicle to change speeds to each of the efficient vehicle speeds.

If an efficient vehicle speed is less than the current speed and the vehicle is capable of recovering energy during a deceleration then the amount of energy required to reach the efficient vehicle speed may be negative. A negative amount of energy may correspond to a gain in total energy of the vehicle. On the other hand, if an efficient vehicle speed is greater than the current speed, the amount of energy required to reach the efficient vehicle speed may be positive. A positive amount of energy indicates that the vehicle will use energy to reach the efficient vehicle speed.

The ECU may determine or predict the distance at which the vehicle can travel at or near the speed limit in multiple ways. For example, the ECU may compare the current location of the vehicle to map data stored in the memory or retrieved via the network access device to determine a distance at which the current speed limit remains without change. The ECU may also compare a route of the vehicle to the map data to determine if or when the vehicle will turn on to another road having a different speed limit. In some embodiments, the ECU may know or predict a route of the vehicle and may compare the known or predicted route to the map data.

In block 222, the ECU may calculate a total efficiency of each of the multiple efficient vehicle speeds. The ECU may calculate this total efficiency based on the efficiency differential determined in block 218 along with the amount of energy required to reach each of the multiple efficient vehicle speeds and the distance at which the vehicle can travel at or near the speed limit that was determined in block 220.

For example, if a relatively large amount of energy is required to reach an efficient vehicle speed and the vehicle may only travel at the efficient vehicle speed for a relatively short period of time then the total efficiency for traveling at the efficient vehicle speed may be relatively low. Conversely, if a relatively small amount of energy is required to reach an efficient vehicle speed and the vehicle is capable of traveling at the efficient vehicle speed for a relatively long period of time then the total efficiency for traveling at the efficient vehicle speed may be relatively high.

As another example, if a relatively large amount of energy is required to reach an efficient vehicle speed and the energy differential for the efficient vehicle speed is relatively low then the total efficiency for traveling at the efficient vehicle speed may be relatively low. Conversely, if a relatively small amount of energy is required to reach an efficient vehicle speed and the energy differential for the efficient vehicle speed is relatively high then the total efficiency for traveling at the efficient vehicle speed may be relatively high.

In block 224, the ECU may compare the total efficiency of each of the efficient vehicle speeds. The ECU may eliminate one or more of the efficient vehicle speeds having a relatively low total efficiency. For example, a speed limit may be 70 mph and the corresponding efficient vehicle speeds may be 65 mph, 69 mph, and 72 mph. The ECU may determine that the vehicle will save half a gallon of gasoline if it travels at 65 mph, will save ⅗ of a gallon of gasoline if it travels at 69 mph, and will not save any gasoline if it travels at 72 mph. In this example, the ECU may eliminate 72 mph as an efficient vehicle speed because it will not save any gasoline.

In block 226, the ECU may rank the one or more efficient vehicle speeds. For example, the ECU may rank the one or more efficient vehicle speeds based on the energy differential determined in block 218, based on the total efficiency determined in block 222, or based on a combination of the energy differential and the total efficiency. The ECU may rank the efficient vehicle speeds based on an order of efficiency. For example, an efficient vehicle speed having a greater energy differential or a greater total efficiency may be ranked higher than an efficient vehicle speed having a smaller energy differential or total efficiency.

In block 228, the ECU may control an output device to output the efficient vehicle speeds and the corresponding energy differential or a total efficiency when the vehicle is within the steady speed range (i.e., in a cruising state). In some embodiments, the ECU may only output the efficient vehicle speeds when the vehicle is not already traveling at an efficient vehicle speed. In some embodiments, if the vehicle is already traveling at an efficient vehicle speed then the ECU may control the output device to output data indicating that the vehicle is traveling at an efficient vehicle speed.

A driver may view the efficient vehicle speeds and corresponding energy differential or total efficiency and may decide to drive the vehicle at one of the efficient vehicle speeds. In some embodiments, the ECU may control the output device to output data verifying that the vehicle is being driven at one of the efficient vehicle speeds when the driver is driving at the one of the efficient vehicle speeds. In some embodiments, the ECU may control the output device to output the corresponding energy differential or total efficiency after a period of time has elapsed since outputting the efficient vehicle speeds without the vehicle traveling at one of the efficient vehicle speeds.

In some embodiments, the vehicle may be autonomous. In that regard, the ECU may control the power source to move the vehicle at one of the efficient vehicle speeds, such as the most efficient vehicle speed, without verification from a user or driver.

In some embodiments, the ECU may control the network access device to output the efficient vehicle speeds, or the current speed of the vehicle, to nearby vehicles in block 230. By outputting the efficient vehicle speeds or the current speed, the ECU may identify the current or future speed of the vehicle to other vehicles. In that regard, the nearby vehicles may be aware of the speed at which the current vehicle is traveling. The ECU may transmit this information to promote awareness or reasoning behind the current vehicle speed. In some embodiments, another vehicle with a similar efficiency profile may caravan with the present vehicle to improve traffic flow and fuel efficiency based on the transmitted speed.

In block 232, the ECU may control the output device to cease outputting the efficient vehicle speed when an upcoming grade of the current roadway varies from the current grade by more than a predetermined grade threshold. The predetermined grade threshold may correspond to a change of grade sufficiently great to change the vehicle load enough that the efficient vehicle speed calculation may change. For example, an efficient speed for a grade of 0% may be 70 mph. The vehicle may be approaching a hill at which the grade becomes 5%. The grade change of 5% may be sufficiently large that 70 mph is no longer an efficient speed for the vehicle. In that regard, the ECU may control the output device to cease outputting the efficient vehicle speed as the vehicle is approaching the hill.

In some embodiments, the ECU may calculate or determine one or more new efficient vehicle speeds for the upcoming hill based on the new load applied by the 5% grade. In some embodiments, the ECU may control the vehicle to change to one of the new efficient vehicle speeds when the vehicle reaches the start of the hill.

In block 234, the driver of the vehicle may occasionally request that the vehicle operate in a cruise control mode. A cruise control mode corresponds to a mode in which the ECU controls the vehicle to operate at a steady speed. In block 236, if the driver has requested the cruise control mode, the ECU may control the vehicle to operate at one of the efficient vehicle speeds.

In some embodiments, the ECU may be capable of calculating an energy-efficient acceleration pattern from a current speed of the vehicle to a target vehicle speed, such as one of the efficient vehicle speeds. In that regard, the ECU may control the power source to accelerate the vehicle to the target speed using the efficient acceleration pattern. For example, the ECU may determine the one or more efficient vehicle speeds and output the one or more efficient vehicle speeds via the output device.

The user may select one of the one or more efficient vehicle speeds using an input device. In some embodiments the ECU may control the vehicle to accelerate to the selected efficient vehicle speed using the energy-efficient acceleration pattern in response to the user selection of the efficient vehicle speed. In some embodiments, the user may provide input via an input device requesting the ECU to accelerate to the efficient vehicle speed and the ECU may control the vehicle to accelerate to the selected efficient vehicle speed in response to this user input.

Figure 3A:
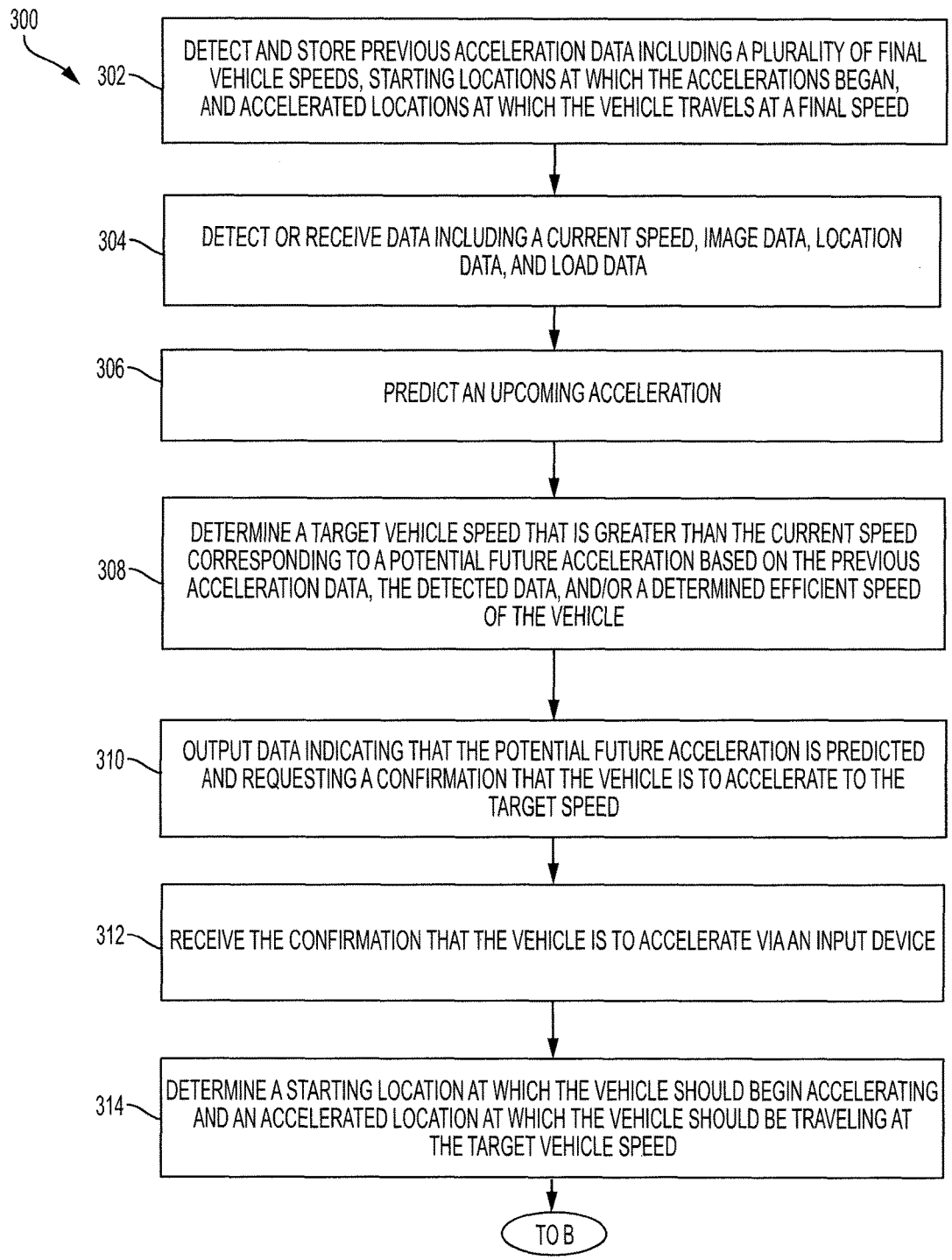
FIGS. 3A and 3B are flowcharts illustrating a method for determining an efficient vehicle acceleration pattern based on a target speed and a current vehicle load according to an embodiment of the present invention.
Figure 3B:
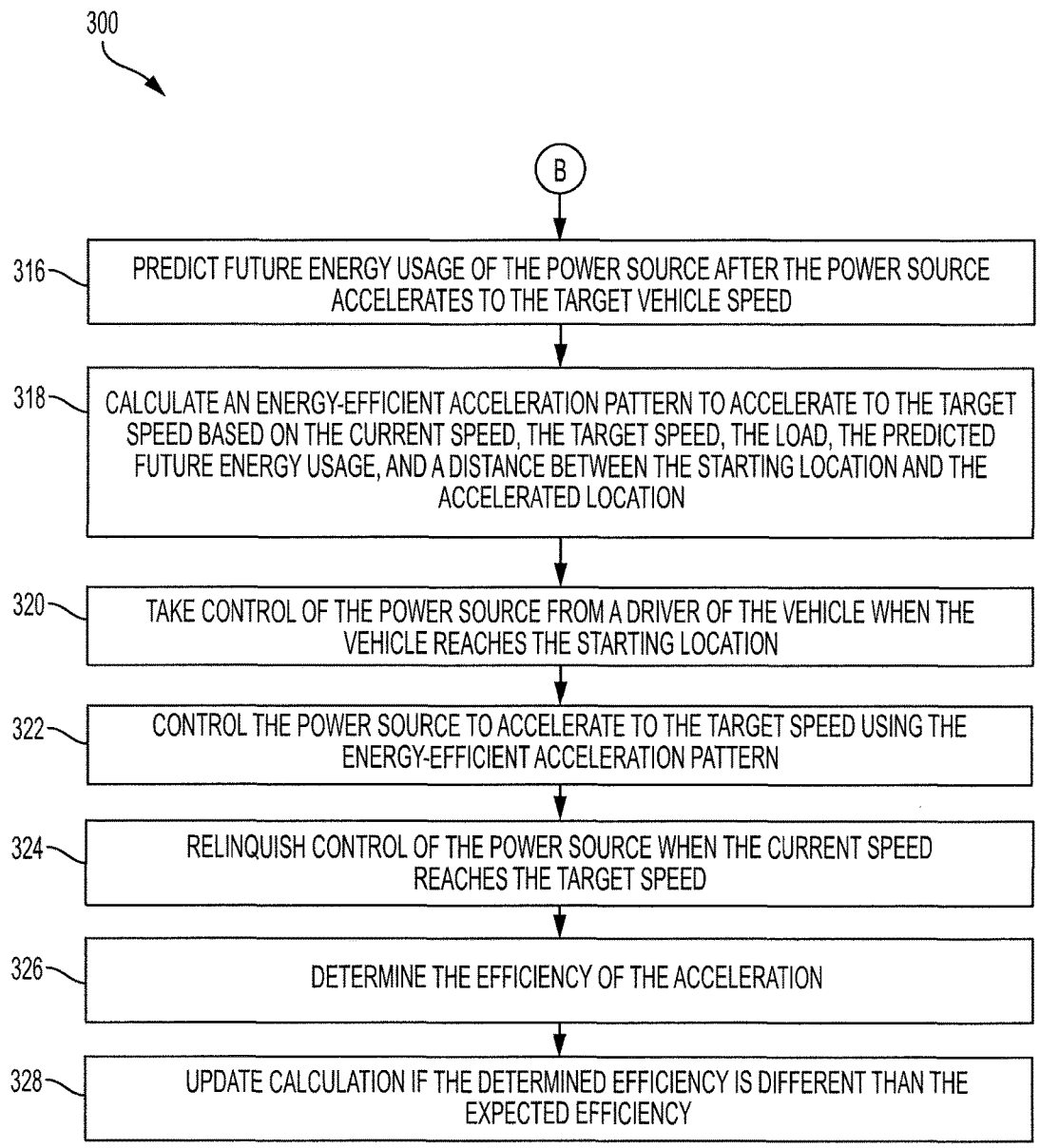

Referring now to FIGS. 3A and 3B, a method 300 for controlling a vehicle, such as the vehicle 100 of FIG. 1, to accelerate efficiently is shown. In block 200, various components of the vehicle may detect and store previous accelerations data. The previous acceleration data may be detected and stored as the vehicle is driven. In some embodiments, at least some of the previous acceleration data may be detected and stored by the vehicle manufacturer during vehicle testing cycles. The previous acceleration data may include a plurality of final vehicle speeds, starting locations at which accelerations began, and accelerated locations at which the vehicle reaches the final vehicle speed. Each of the final vehicle speeds corresponds to a final speed of the vehicle after the vehicle has completed an acceleration. In some embodiments, the previous acceleration data may include additional data such as loads of the vehicle and corresponding efficiency of each of the accelerations.

In block 304, various components of the vehicle may detect or receive data including a current speed of the vehicle, image data corresponding to a roadway of the vehicle, location data corresponding to a current location of the vehicle, and load data corresponding to a load of the vehicle. The load data may include data corresponding to the current load of the vehicle as well as to a potential future load of the vehicle. For example, the vehicle may be traveling along a city road having a relatively low-grade (such as 1% or 2%), and a route may indicate that the vehicle will take an upcoming highway on-ramp. The ECU may determine that the highway on-ramp has a relatively large grade (such as 5%). In that regard, the load data may include the grade of the current roadway and the grade of the upcoming highway on-ramp.

In block 306, the ECU may predict an upcoming acceleration of the vehicle based on detected or received data. For example, the ECU may predict that an acceleration is forthcoming when the camera detect image data corresponding to a speed limit sign that indicates that a current speed limit of the roadway will increase. Similarly, the ECU may compare the current location of the vehicle to the stored starting locations at which the accelerations began. If the current location of the vehicle is approaching one of the stored starting locations then the ECU may determine that the vehicle will accelerate when it reaches the upcoming stored starting location.

As yet another example, the ECU may know or predict a route of the vehicle. The ECU may further determine, based on the known or predicted route and the current location of the vehicle, that the vehicle will be entering a highway on-ramp or making a turn and will thus accelerate on the on-ramp or accelerate or decelerate after the turn. A similar tactic may be used to determine when a speed limit of a current roadway changes.

In some embodiments, the ECU may prioritize predicted accelerations that have been previously performed in a relatively inefficient manner. For example, the ECU may only perform the remaining steps of the method 300 if previously-detected data indicates that the predicted acceleration has been performed relatively inefficiently by the driver. For example, the ECU may be aware of three vehicle accelerations. In a first acceleration, the ECU may determine that a maximum efficient control can only increase efficiency by 10%; in a second, the ECU may determine that the efficiency can be increased by 5%; in a third, the ECU may determine that the efficiency can be increased by 50%.

In some embodiments, the ECU will only perform the remaining steps of the method 300 for the third acceleration. In some embodiments, the ECU may perform the remaining steps of the method 300 if the efficiency can be increased by an efficiency threshold that corresponds to an efficiency that may provide sufficient energy savings to the driver. For example, the efficiency threshold may be 25%, 50%, or the like. Stated differently, the ECU may control the power source to accelerate the vehicle when an efficiency of the energy-efficient acceleration pattern is at least an energy threshold percentage above a previous efficiency of a previously performed acceleration pattern for a same location.

In some embodiments, the ECU may only perform the remaining steps of the method 300 if a user of the vehicle has requested acceleration assistance via an input device.

In some embodiments, the method 300 may be applied only to accelerations to target speeds that are greater than the current speed of the vehicle. Accordingly and in block 308, the ECU may determine a target vehicle speed that is greater than the current speed of the vehicle. The target vehicle speed may correspond to a final speed of the vehicle after an upcoming acceleration has been performed.

The target vehicle speed may be determined based on detected data, received data, data stored in the memory, or the like. For example, the camera may detect data corresponding to a speed limit sign and the ECU may determine that the target vehicle speed is the new speed limit. As another example, if the current location of the vehicle is approaching one of the stored starting locations, then the ECU may determine that the target vehicle speed is the stored final vehicle speed that corresponds to the upcoming stored starting location.

As yet another example, the ECU may determine one or more efficient vehicle speeds for a current or upcoming speed limit, and may further determine the target vehicle speed based on the one or more efficient vehicle speed.

In block 310, the ECU may control an output device to output data indicating the prediction of the upcoming acceleration and the determined target vehicle speed. In some embodiments, the ECU may further control the output device to output data requesting a confirmation of the upcoming acceleration and the target vehicle speed. For example, the output device may output information such as "it is predicted that you will accelerate onto the 405 on-ramp in a quarter of a mile. Would you like for the acceleration to be handled autonomously?"

In some embodiments, if the ECU determines multiple efficient vehicle speeds in block 308, then the ECU may control the output device to output the multiple efficient vehicle speeds and request a selection of one of the multiple efficient vehicle speeds from a driver or user of the vehicle. In some embodiments, the ECU may also output energy differentials or total amounts of energy expected to be used for each of the multiple efficient vehicle speeds to provide incentive for the driver or user to select one of the efficient vehicle speeds.

If the ECU controls the output device to output the confirmation request then the ECU may receive the confirmation from the user via an input device in block 312. In some embodiments, the confirmation may also include a selection of one of the multiple efficient vehicle speeds.

In some embodiments, if the driver takes longer than a predetermined time period to respond to the confirmation request, then the system may time out. In some embodiments, the system may instead proceed without confirmation if the driver has previously requested acceleration assistance.

In block 314, the ECU may determine a starting location at which the vehicle should begin accelerating. The ECU may also or instead determine an accelerated location at which the vehicle should reach or be traveling at the target vehicle speed. The ECU may determine the starting location based on detected or received data. For example, the ECU may compare the current location of the vehicle to the previously stored starting locations and may determine that the previously stored starting location is the starting location for the forthcoming acceleration. As another example, the ECU may analyze detected image data to determine a location of a speed limit sign with an increased speed limit, and may determine that the starting location is the location of the speed limit sign.

The ECU may also determine the accelerated location based on detected or received data. For example, the ECU may analyze the detected image data to determine a location of a speed limit sign with an increased speed limit, and may determine that the accelerated location is the location of the speed limit sign. As another example, the ECU may compare the current location of the vehicle to the data stored in the memory and may determine that a previously stored accelerated location which the vehicle is approaching is the accelerated location for the forthcoming acceleration.

In some embodiments, the ECU may determine the starting location based on the accelerated location. For example, the ECU may determine that the vehicle is approaching a highway on-ramp and may determine that the accelerated location is the location at which the vehicle merges onto the highway. The ECU may determine that the starting location is a predetermined distance before the accelerated location, such as 100 yards, 200 yards, or the like. The predetermined distance may correspond to a distance which provides sufficient time for the power source to efficiently accelerate to the target vehicle speed. In some embodiments, the predetermined distance may vary based on the current vehicle speed and the target vehicle speed such that the predetermined distance is greater for greater current or target vehicle speeds.

In block 316, the ECU may predict future energy usage of the power source after the power source accelerates to the target vehicle speed. The prediction of the future energy usage may be based on information such as the target vehicle speed, the distance at which the vehicle will travel at the target vehicle speed, and load information including a current and future grade of traveled roadways. The predicted future energy usage may include information such as an amount of fuel or electrical energy that will be used until the vehicle decelerates, whether the motor-generator will be capable of generating electricity during any forthcoming portion of the route, or the like.

In block 318, the ECU may calculate an energy-efficient acceleration pattern to accelerate the vehicle to the target speed. The energy-efficient acceleration pattern may correspond to an acceleration pattern that provides greater energy efficiency than other acceleration patterns. In that regard, the vehicle may conserve fuel or electrical energy by accelerating using the energy-efficient acceleration pattern rather than accelerating using a different acceleration pattern.

The ECU may calculate the energy-efficient acceleration patterns based on various information such as one or more of the current speed of the vehicle, the target speed of the vehicle, the load of the vehicle (a current grade of a roadway and a forthcoming grade of an upcoming portion of the roadway), the predicted future energy usage, a distance at which the vehicle will travel at the target vehicle speed, a current state of charge (SOC) of the battery or fuel level, current traffic conditions, and a distance between the starting location of the acceleration and the accelerated location.

The ECU may utilize the current speed of the vehicle and the target speed of the vehicle to determine an amount of acceleration required to reach the target speed from the current speed. The load data may include information such as a mass of the vehicle, an amount of headwind or tailwind, an altitude of the roadway, an amount of traffic on the roadway or the accelerated location, a current grade of the roadway, and a future grade of the roadway.

The grade information may be utilized in the calculation because the power source may be more efficient at a given power output level when the vehicle is under a first load, and may be more efficient at another power output level when the vehicle is under a different load.

The energy-efficient acceleration patterns may further include information such as an amount of power requested from an engine and an amount of power requested from a motor-generator. For example, it may be beneficial in some accelerations to utilize only power from the motor-generator, it may be beneficial to utilize only power from the engine, or it may be beneficial to use a blend of power from the engine and the motor-generator. In that regard, the potential future energy usage may affect the decision of whether to utilize power from the motor-generator, the engine, or a blend of power.

For example, if the potential future energy usage indicates that the motor-generator will be capable of generating electricity shortly after the acceleration then the ECU may control the motor-generator to generate a majority of the power for the acceleration. Similarly, if the target vehicle speed is a cruising speed at which the motor-generator may provide all power then the acceleration may be more efficient if the engine is controlled to generate a majority of the power for the acceleration. Such control may retain sufficient SOC for the battery and motor-generator to propel the vehicle for the duration of the cruising speed.

The distance at which the vehicle will travel at the target vehicle speed may affect the target speed or the energy-efficient acceleration pattern. For example, if the vehicle is approaching a highway on-ramp but will only travel on the highway for half of a mile then the ECU may set the target vehicle speed to be lower than if the vehicle will travel on the highway for many miles. This is because the extra energy used to accelerate the vehicle to the higher-speed may be wasted because the vehicle will decelerate shortly after reaching the target speed.

In block 320, the ECU may take control of the power source from a driver of the vehicle when the vehicle reaches the starting location of the acceleration. In some embodiments, the ECU may take control of the power source from the driver at an earlier point in time, such as when the driver confirms the forthcoming acceleration. The ECU may provide an option at any point in time for the driver to cancel the autonomous control of the power source. For example, the user may cancel the autonomous control via the input device, by depressing a brake pedal, or the like.

In some embodiments, the vehicle may be operating in an autonomous cruise control. In that regard, the ECU may already have control of the power source of the vehicle and need not take control from a driver.

In block 322, the ECU may control the power source to accelerate the vehicle to the target speed using the energy-efficient acceleration pattern determined in block 318. In some embodiments, if the driver fails to confirm the acceleration assistance request until the starting location has been passed, the ECU may update the calculation based on the current location to determine an updated efficient acceleration pattern. The ECU may then take control of the power source and implemented the updated efficient acceleration pattern upon receiving the confirmation at the new starting location.

In block 324, the ECU may relinquish control of the power source when the current speed reaches the target speed. In some embodiments, the ECU may first output data indicating that control of the power source will be relinquished shortly and requesting confirmation from the driver that the driver wishes to take control of the power source. In some embodiments, the driver may indicate a preference for the ECU to continue controlling the power source, i.e., for the ECU to control the vehicle in a cruise control or autonomous mode. In that regard, the ECU may continue controlling the power source after the vehicle reaches the target vehicle speed.

In block 326, the ECU may determine the efficiency of the acceleration. In some embodiments, the ECU may determine the efficiency of the acceleration during the acceleration and, in some embodiments, the ECU may determine the efficiency of the acceleration after the acceleration is complete. The ECU may determine the efficiency of the acceleration by determining an amount of energy (including fuel and electrical energy) used during the acceleration, and comparing the used amount of energy to the acceleration pattern. In some embodiments, the ECU may determine the efficiency of the acceleration using any other available method.

In block 328, the ECU may update the calculation of the energy-efficient acceleration pattern if the efficiency determined in block 326 is different than the expected efficiency. For example, the calculation may be based on a set of data including previously-detected efficiency data. In some embodiments, the ECU may update the calculation by updating the set of data upon which the calculation is based. In some embodiments, the ECU may update or adjust the calculation (or implement the calculation in a different manner) by altering the acceleration pattern mid-acceleration. For example, if the motor-generator is utilizing more electrical energy than anticipated, the ECU may update the calculation by controlling the motor-generator to generate less power.

Figure 4:
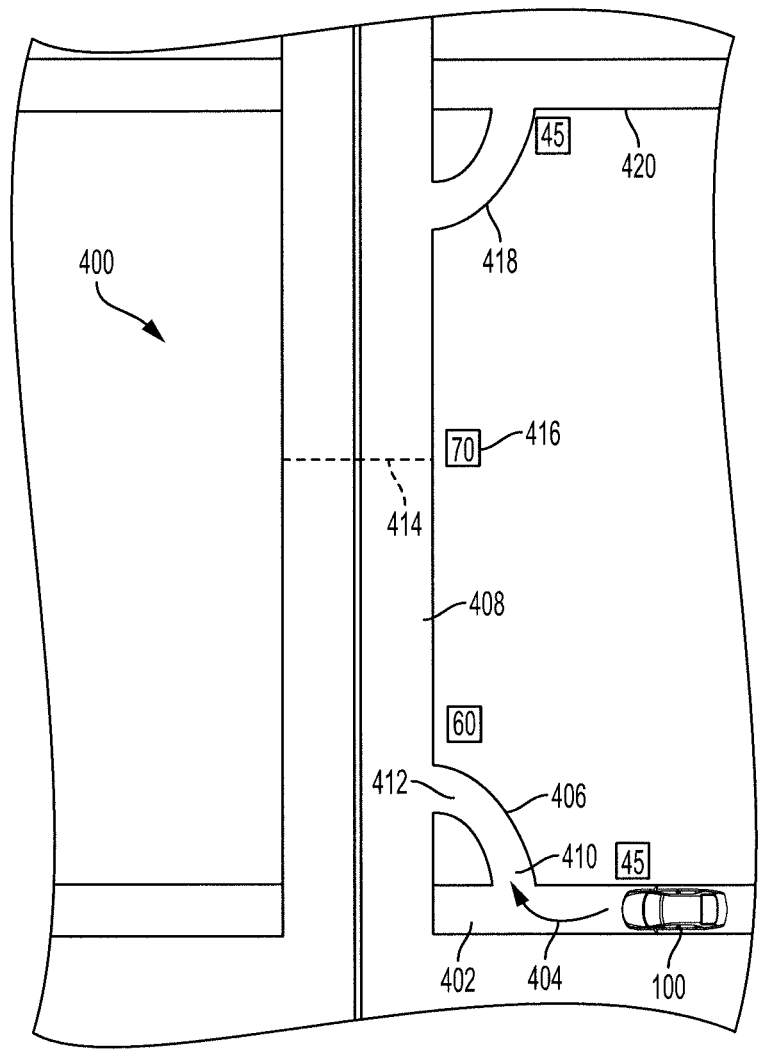
FIG. 4 is a drawing illustrating an exemplary use of the method of FIGS. 2A and 2B and the method of FIGS. 3A and 3B by the vehicle 100 of FIG. 1 according to an embodiment of the present invention.

Referring now to FIGS. 1 and 4, the vehicle 100 may be traveling along a road system 400 and may utilize the method 200 of FIGS. 2A and 2B and the method 300 of FIGS. 3A and 3B. The vehicle 100 may initially be traveling on a city road 402 in a direction 404. The city road 402 may have a speed limit of 45 mph. The ECU 102 of the vehicle 100 may predict that the vehicle will take a highway on-ramp 406 to enter a highway 408. The ECU 102 may further determine that the speed limit of the highway 408 is 60 mph. The ECU may determine that the starting location of the acceleration is an entrance 410 of the on-ramp 406 and the accelerated location is the exit 412 of the on-ramp 406.

The ECU 102 may control the output device 138 to output data indicating that the vehicle 100 is predicted to accelerate to 60 mph starting at the entrance 410 to the highway on-ramp 406. The ECU 102 may further control the output device 138 to request confirmation from the driver that the ECU 102 is to control the acceleration. The input device may receive such verification from the driver.

The ECU 102 may determine the current vehicle speed and the load of the vehicle (including a grade of the on-ramp 406) based on detected or received data. Based on the current vehicle speed, the load of the vehicle, the target speed of 60 mph, and the distance between the entrance 410 and the exit 412, the ECU 102 may calculate an energy-efficient acceleration pattern. As the vehicle 100 approaches the entrance 410, the ECU 102 may take control of the power source 111 from the driver and may control the vehicle 100 to accelerate to 60 mph using the energy-efficient acceleration pattern.

When the vehicle 100 reaches the exit 412 of the on-ramp 406, the ECU 102 may relinquish control of the power source 111 to the driver. The ECU 102 may then compare the current speed limit of 60 mph and the current vehicle load to a lookup table to retrieve one or more efficient vehicle speeds. The ECU 102 may determine that a first efficient vehicle speed is 57 mph and a second efficient vehicle speed is 62 mph. In some embodiments, the ECU may determine the efficient vehicle speeds prior to calculating the efficient acceleration pattern and may select one of the efficient vehicle speeds (or request the driver to select one of the efficient vehicle speeds) as the target vehicle speed for the acceleration along the on-ramp 406.

The ECU 102 may then calculate and control the output device 138 to output an energy differential for each of the efficient vehicle speeds. The driver may view the efficient vehicle speeds and may control the power source 111 to move the vehicle at a selected efficient vehicle speed.

The speed limit of the highway 408 may increase to 70 mph at a location 414. The camera 120 may detect a speed limit sign 416 as the vehicle 100 approaches the speed limit sign 416. The ECU 102 may output data indicating that the ECU 102 predicts that the vehicle will accelerate to 70 mph and requesting verification of the acceleration from the driver. Upon receiving the verification, the ECU 102 may utilize the lookup table to determine one or more efficient vehicle speed for the portion of the highway 408 after the speed limit sign 416. For example, the ECU 102 may determine that 67 mph and 72 mph are efficient speeds. The ECU 102 may further predict that the vehicle 100 will take an off-ramp 418 to another city road 420 a relatively short distance after the acceleration to 70 mph. Because the vehicle 100 will only travel on the highway 408 at 70 mph for a relatively short period of time, the ECU 102 may eliminate 72 mph from the efficient speed list.

As the vehicle 100 approaches the location 414, the ECU 102 may take control of the power source 111 and control the power source 111 to accelerate the vehicle to 67 mph. The ECU 102 may then relinquish control of the power source 111 back to the driver or, based on a driver request, may control the vehicle to remain at 67 mph in an autonomous or cruise control mode.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling a vehicle to accelerate efficiently, comprising:
    a power source configured to generate power to propel the vehicle;
    a speed sensor configured to detect a current speed of the vehicle;
    a camera configured to detect image data corresponding to a current roadway;
    a global positioning system (GPS) sensor configured to detect location data corresponding to a current location of the vehicle; and
    an electronic control unit (ECU) coupled to the power source, the speed sensor, the camera, and the GPS sensor, and configured to:
        determine a target vehicle speed that is greater than the current speed of the vehicle based on at least one of the image data or the location data,
        calculate an energy-efficient acceleration pattern to accelerate the vehicle from the current speed to the target vehicle speed based on a goal to minimize energy usage of the power source, and
        control the power source to accelerate the vehicle from the current speed to the target vehicle speed using the energy-efficient acceleration pattern when an efficiency of the energy-efficient acceleration pattern is at least an energy threshold percentage above a previous efficiency of a previously performed acceleration pattern for a same location.

2. The system of claim 1 further comprising a load sensor configured to detect load data corresponding to a current load of the vehicle, wherein the ECU is further configured to determine the current load of the vehicle based on the load data and to calculate the energy-efficient acceleration pattern based on the current load of the vehicle.

3. The system of claim 2 wherein the current load of the vehicle is based on at least one of a grade of the current roadway, a total mass of the vehicle, an altitude of the current roadway, a velocity of a headwind or a tailwind, or a current ambient temperature outside of the vehicle.

4. The system of claim 1 further comprising:
    an output device configured to output data indicating that the vehicle is predicted to accelerate to the target vehicle speed and requesting a confirmation that the vehicle is to accelerate to the target vehicle speed; and
    an input device configured to receive the confirmation that the vehicle is to accelerate to the target vehicle speed, the confirmation corresponding to a request for the ECU to control the power source to accelerate the vehicle to the target vehicle speed,
    wherein the ECU is configured to control the power source to accelerate the vehicle to the target vehicle speed after the input device receives the confirmation.

5. The system of claim 1 wherein the ECU is configured to take control of the power source from a driver of the vehicle to accelerate the vehicle to the target vehicle speed, and to relinquish the control of the power source to the driver of the vehicle when the current speed of the vehicle equals the target vehicle speed.

6. The system of claim 1 further comprising a memory configured to store previous acceleration data including a plurality of final vehicle speeds and corresponding starting locations at which previous accelerations to the plurality of final vehicle speeds began, wherein the ECU is further configured to:
    determine the target vehicle speed by comparing the current location of the vehicle to the starting locations of the previous acceleration data; and
    control the power source to accelerate the vehicle from the current speed to the target vehicle speed beginning when the current location of the vehicle reaches one of the starting locations of the previous acceleration data.

7. The system of claim 1 wherein the ECU is further configured to determine a starting location at which the vehicle should start accelerating to the target vehicle speed based on at least one of a known vehicle route, a predicted vehicle route, or a highway on-ramp or a speed limit sign included in the image data.

8. The system of claim 7 wherein the ECU is further configured to:
    determine an accelerated location at which the vehicle should be traveling at the target vehicle speed; and
    determine the energy-efficient acceleration pattern based on the current speed of the vehicle and a distance between the starting location and the accelerated location.

9. The system of claim 1 wherein the ECU is further configured to:

determine a current speed limit of the current roadway based on at least one of the image data or the location data;

determine an efficient speed of the vehicle based on the current speed limit of the current roadway; and determine the target vehicle speed to be equal to the efficient speed of the vehicle.

10. The system of claim 1 wherein the ECU is further configured to predict future energy usage of the power source after the power source accelerates to the target vehicle speed and to calculate the energy-efficient acceleration pattern based on the predicted energy usage.

11. A system for controlling a vehicle to accelerate efficiently, comprising:

a power source configured to generate power to propel the vehicle;

a speed sensor configured to detect a current speed of the vehicle;

a camera configured to detect image data corresponding to a current roadway;

a global positioning system (GPS) sensor configured to detect location data corresponding to a current location of the vehicle;

an input device configured to receive input data;

an output device configured to output data; and an electronic control unit (ECU) coupled to the power source, the speed sensor, the camera, the GPS sensor, the input device, and the output device, and configured to:

predict that the vehicle is to accelerate to a target vehicle speed based on at least one of the image data or the location data, control the output device to output data indicating the predicted acceleration, receive confirmation via the input device that the vehicle is to accelerate to the target vehicle speed, calculate an energy-efficient acceleration pattern to accelerate the vehicle from the current speed to the target vehicle speed based on a goal to minimize energy usage of the power source, and control the power source to accelerate the vehicle from the current speed to the target vehicle speed using the energy-efficient acceleration pattern after the input device receives the confirmation and when an efficiency of the energy-efficient acceleration pattern is at least an energy threshold percentage above a previous efficiency of a previously performed acceleration pattern for a same location.

12. The system of claim 11 further comprising a load sensor configured to detect load data corresponding to a current load of the vehicle and including at least one of a grade of the current roadway, a total mass of the vehicle, an altitude of the current roadway, a velocity of a headwind or a tailwind, or a current ambient temperature outside of the vehicle, wherein the ECU is further configured to determine the current load of the vehicle based on the load data and to calculate the energy-efficient acceleration pattern based on the current load of the vehicle.

13. The system of claim 11 wherein the ECU is configured to take control of the power source from a driver of the vehicle to accelerate the vehicle to the target vehicle speed, and to relinquish the control of the power source to the driver of the vehicle when the current speed of the vehicle equals the target vehicle speed.

14. The system of claim 11 further comprising a memory configured to store previous acceleration data including a plurality of final vehicle speeds and corresponding starting locations at which previous accelerations to the plurality of final vehicle speeds began, wherein the ECU is further configured to:

predict that the vehicle is to accelerate to the target vehicle speed when the location data indicates that the current location of the vehicle is approaching one of the starting locations; and determine the target vehicle speed by determining that the target vehicle speed equals a final vehicle speed that corresponds to the one of the starting locations.

15. The system of claim 11 wherein the ECU is further configured to:

determine a starting location at which the vehicle should start accelerating to the target vehicle speed based on at least one of a known vehicle route, a predicted vehicle route, or a highway on-ramp or a speed limit sign included in the image data;

determine an accelerated location at which the vehicle should be traveling at the target vehicle speed; and determine the energy-efficient acceleration pattern based on the current speed of the vehicle and a distance between the starting location and the accelerated location.

16. A method for controlling a vehicle to accelerate efficiently, comprising:

generating, by a power source, power to propel the vehicle;

detecting, by a speed sensor, a current speed of the vehicle;

detecting, by a camera, image data corresponding to a current roadway;

detecting, by a global positioning system (GPS) sensor, location data corresponding to a current location of the vehicle;

determining, by an electronic control unit (ECU), a target vehicle speed that is greater than the current speed of the vehicle based on at least one of the image data or the location data;

calculating, by the ECU, an energy-efficient acceleration pattern to accelerate the vehicle from the current speed to the target vehicle speed based on a goal to minimize energy usage of the power source; and controlling, by the ECU, the power source to accelerate the vehicle from the current speed to the target vehicle speed using the energy-efficient acceleration pattern when an efficiency of the energy-efficient acceleration pattern is at least an energy threshold percentage above a previous efficiency of a previously performed acceleration pattern for a same location.

17. The method of claim 16 further comprising:

outputting, by an output device, data indicating that the vehicle is predicted to accelerate to the target vehicle speed and requesting a confirmation that the vehicle is to accelerate to the target vehicle speed;

receiving, by an input device, the confirmation that the vehicle is to accelerate to the target vehicle speed, the confirmation corresponding to a request for the ECU to control the power source to accelerate the vehicle to the target vehicle speed;

determining, by the ECU, a starting location at which the vehicle should start accelerating to the target vehicle speed;

taking over, by the ECU, control of the power source from a driver of the vehicle to accelerate the vehicle to the target vehicle speed when the vehicle reaches the starting location; and relinquishing, by the ECU, control of the power source to the driver of the vehicle when the current speed of the vehicle reaches the target vehicle speed.

18. The method of claim 16 further comprising:

storing, in a memory, previous acceleration data including a plurality of final vehicle speeds and corresponding starting locations at which previous accelerations to the plurality of final vehicle speeds began;

determining, by the ECU, the target vehicle speed by comparing the current location of the vehicle to the starting locations of the previous acceleration data; and wherein controlling the power source to accelerate the vehicle from the current speed to the target vehicle speed begins when the current location of the vehicle reaches one of the starting locations of the previous acceleration data.

19. The method of claim 16 further comprising:

determining, by the ECU, a current speed limit of the current roadway based on at least one of the image data or the location data;

determining, by the ECU, an efficient speed of the vehicle based on the current speed limit of the current roadway; and determining, by the ECU, the target vehicle speed to be equal to the efficient speed of the vehicle.

* * * * *